(12) United States Patent
Ichinose et al.

(10) Patent No.: US 10,248,123 B2
(45) Date of Patent: Apr. 2, 2019

(54) MOBILE APPARATUS

(71) Applicant: KABUSHIKI KAISHA TOYOTA JIDOSHOKKI, Kariya-shi, Aichi-ken (JP)

(72) Inventors: Makoto Ichinose, Aichi-ken (JP); Mitsuo Koide, Nagakute (JP); Yuuji Tsusaka, Nagakute (JP); Minoru Tanaka, Nagakute (JP); Akinobu Fujii, Nagakute (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 32 days.

(21) Appl. No.: 15/469,960

(22) Filed: Mar. 27, 2017

(65) Prior Publication Data
US 2017/0285643 A1  Oct. 5, 2017

(30) Foreign Application Priority Data
Mar. 30, 2016 (JP) ................... 2016-069441

(51) Int. Cl.
*G01S 7/48* (2006.01)
*G05D 1/02* (2006.01)
(Continued)

(52) U.S. Cl.
CPC ............ *G05D 1/021* (2013.01); *G01S 7/4808* (2013.01); *G01S 17/08* (2013.01); *G01S 17/42* (2013.01); *G01S 17/87* (2013.01); *G01S 17/936* (2013.01)

(58) Field of Classification Search
CPC .... G05D 1/021; G05D 1/0225; G05D 1/0231; G05D 1/024; G01S 17/08; G01S 17/46
See application file for complete search history.

(56) References Cited

U.S. PATENT DOCUMENTS 4,328,545 A * 5/1982 Halsall ................... G01S 5/16
                                                        180/167
4,939,651 A   7/1990 Onishi
(Continued)

FOREIGN PATENT DOCUMENTS

JP   H63-150711 A    6/1988
JP   03-252707 A    11/1991
JP   2013-065342 A   4/2013

OTHER PUBLICATIONS

Communication dated Sep. 5, 2017, from the European Patent Office in counterpart European application No. 17160002.6.

*Primary Examiner* — Nicholas Kiswanto
(74) *Attorney, Agent, or Firm* — Sughrue Mion, PLLC (57) ABSTRACT

A mobile apparatus includes a main body, a range sensor, an operation device, and a mobile mechanism. The operation device includes a wide route data generation unit that generates a wide route data according to which the main body is moved from a first specified location to a second specified location, a determination unit that determines a location and a posture of a reference object, an approaching route data generation unit that generates an approaching route data according to which the main body is moved from the second specified location to a target location, and a route data switching unit that switches traveling route from the wide rote data to the approaching route data after the approaching route data is generated. The approaching route data generation unit generates the approaching route data while the main body is traveling according to the generated wide route data.

3 Claims, 6 Drawing Sheets

(51) Int. Cl.
  *G01S 17/08* (2006.01)
  *G01S 17/42* (2006.01)
  *G01S 17/87* (2006.01)
  *G01S 17/93* (2006.01)

(56) References Cited

U.S. PATENT DOCUMENTS

| | | | | |
|---|---|---|---|---|
| 5,801,506 A | * | 9/1998 | Netzler | B66F 9/063 180/167 |
| 6,092,010 A | * | 7/2000 | Alofs | G05D 1/0274 180/167 |
| 2001/0001843 A1 | * | 5/2001 | Alofs | G05D 1/0229 701/24 |
| 2007/0269299 A1 | | 11/2007 | Ross et al. | |

* cited by examiner

MOBILE APPARATUS

BACKGROUND OF THE INVENTION

The present disclosure relates to a mobile apparatus.

Research and development have been made for an autonomous mobile apparatus, for example, a vehicle that automatically locates itself at a target location with respect to a reference object. This type of mobile apparatus generally determines its target location based on a route data obtained by detecting a reference object by means of sensors.

Japanese Unexamined Patent Application Publication No. H03-252707 discloses an unmanned forklift truck having a camera and a sensor. With this forklift truck, when the distance between the vehicle body of the forklift truck and its reference object is long, a wide route data is generated using an image data from the camera and the vehicle body is moved to the vicinity of the reference object according to the generated wide route data. When the vehicle body comes to the vicinity of the reference object, the sensor detects the reference object and an approaching route data is corrected based on the detection of the sensors, and the vehicle body is moved to the target location according to the corrected approaching route data.

Japanese Unexamined Patent Application Publication No. 2013-65342 discloses a mobile robot that measures a distance between the mobile robot and a reference object using a laser range sensor and determines its location and posture with respect to the reference object based on the measurement to thereby determine its target location. The mobile robot is configured such that, when a reference object is at a long distance from the robot, the laser range sensor does not start measurement of distance to the reference object (i.e., determination of the location and the posture of the mobile robot with respect to the reference object) until the mobile robot comes to the vicinity of the reference object.

The unmanned forklift truck of Japanese Unexamined Patent Application Publication No, H03-252707 and the mobile robot of the Japanese Unexamined Patent Application Publication No. 2013-65342 determine the target locations precisely by detecting the reference object with sensors. However, the above unmanned forklift truck and the mobile robot need to pause temporarily in order to detect the reference object by the sensors, with the result that the time for moving to the target location is prolonged by the detecting time for which the forklift truck and the mobile robot are paused. This increase in the moving time leads to an increase in the working time as a whole. In view of the above circumstances, the present disclosure is directed to a mobile apparatus that is capable of reducing the time for moving to its target location.

SUMMARY OF THE INVENTION

In accordance with an aspect of the present invention, there is provided a mobile apparatus that moves in a specified range. The mobile apparatus includes a main body, a range sensor that is mounted to the main body and measures a distance between the main body and an object that is present at a position in a specified direction with respect to the main body, an operation device configured to generate a route data according to which the main body is moved, and a mobile mechanism that moves the main body according to the route data generated by the operation device. The operation device includes a wide route data generation unit, a determination unit, an approaching route data generation unit, and a route data switching unit. The wide route data generation unit generates a wide route data according to which the main body is moved from a first specified location to a second specified location. The first specified location and the second specified location are set in the specified range. The determination unit determines a location and a posture of a reference object that is located in the vicinity of the second specified location based on the measured distance received from the range sensor. Based on the determination of the determination unit, the approaching route data generation unit generates an approaching route data according to which the main body is moved from the second specified location to a target location at which the main body is placed in a specified location and a specified posture with respect to the reference object. After the approaching route data is generated, the route data switching unit switches traveling route for the main body from the wide rote data to the approaching route data. The approaching route data generation unit generates the approaching route data while the main body is traveling according to the generated wide route data.

Other aspects and advantages of the invention will become apparent from the following description, taken in conjunction with the accompanying drawings, illustrating by way of example the principles of the invention.

DETAILED DESCRIPTION OF THE EMBODIMENTS

Embodiment

Figure 1:
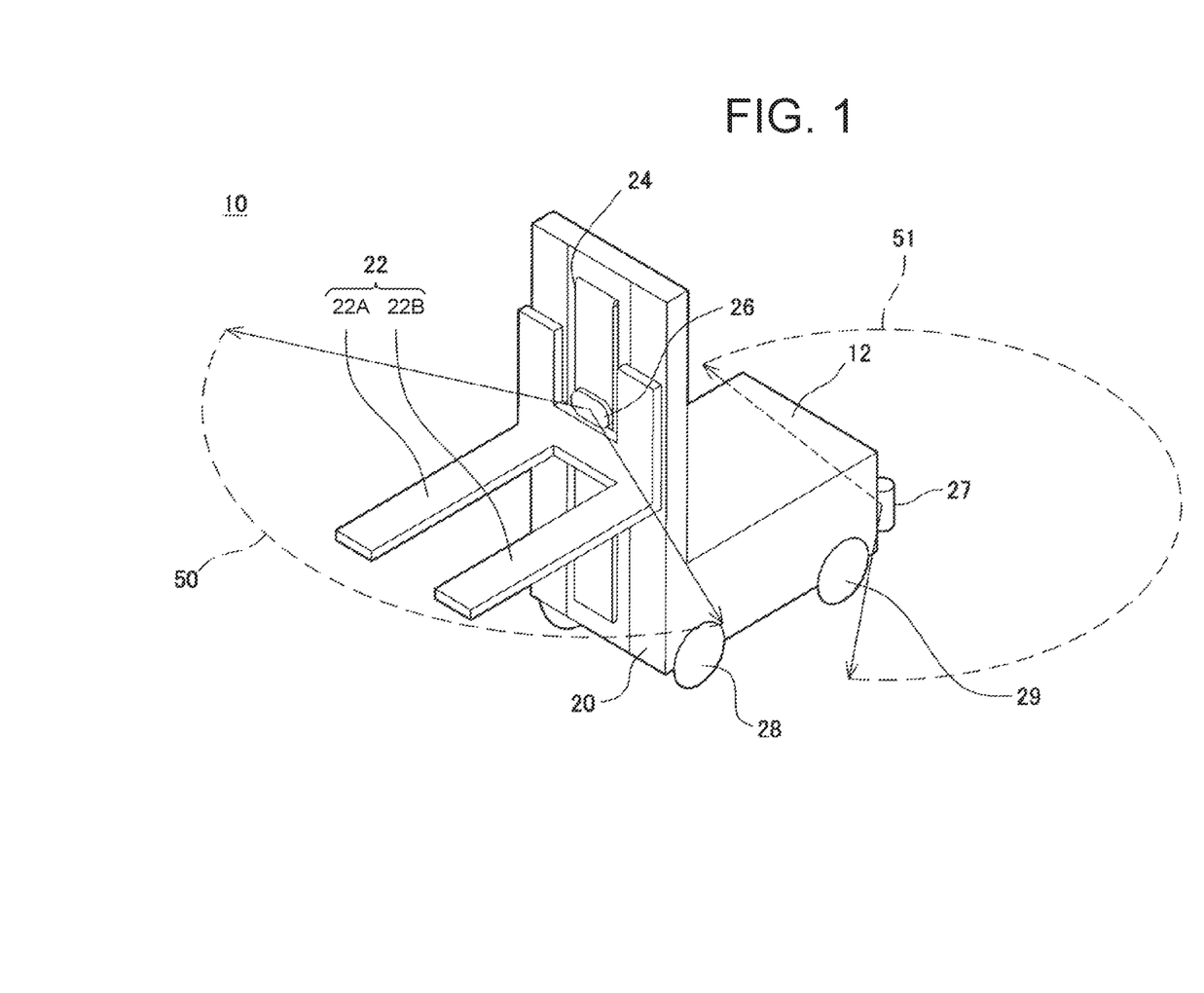
FIG. 1 is a perspective schematic view showing a forklift truck according to an embodiment of the present invention.
Figure 2:
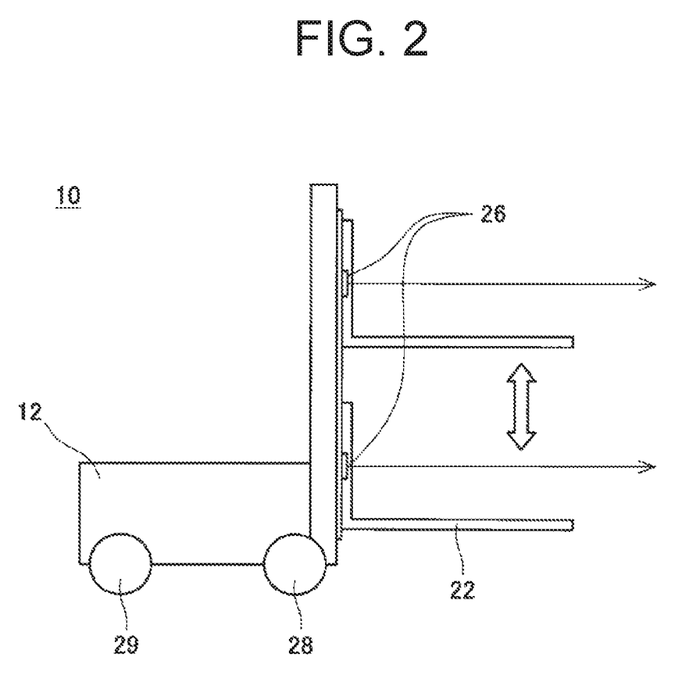
FIG. 2 is a schematic view of the forklift truck of FIG. 1 scanning a reference object by laser beams.
Figure 3:
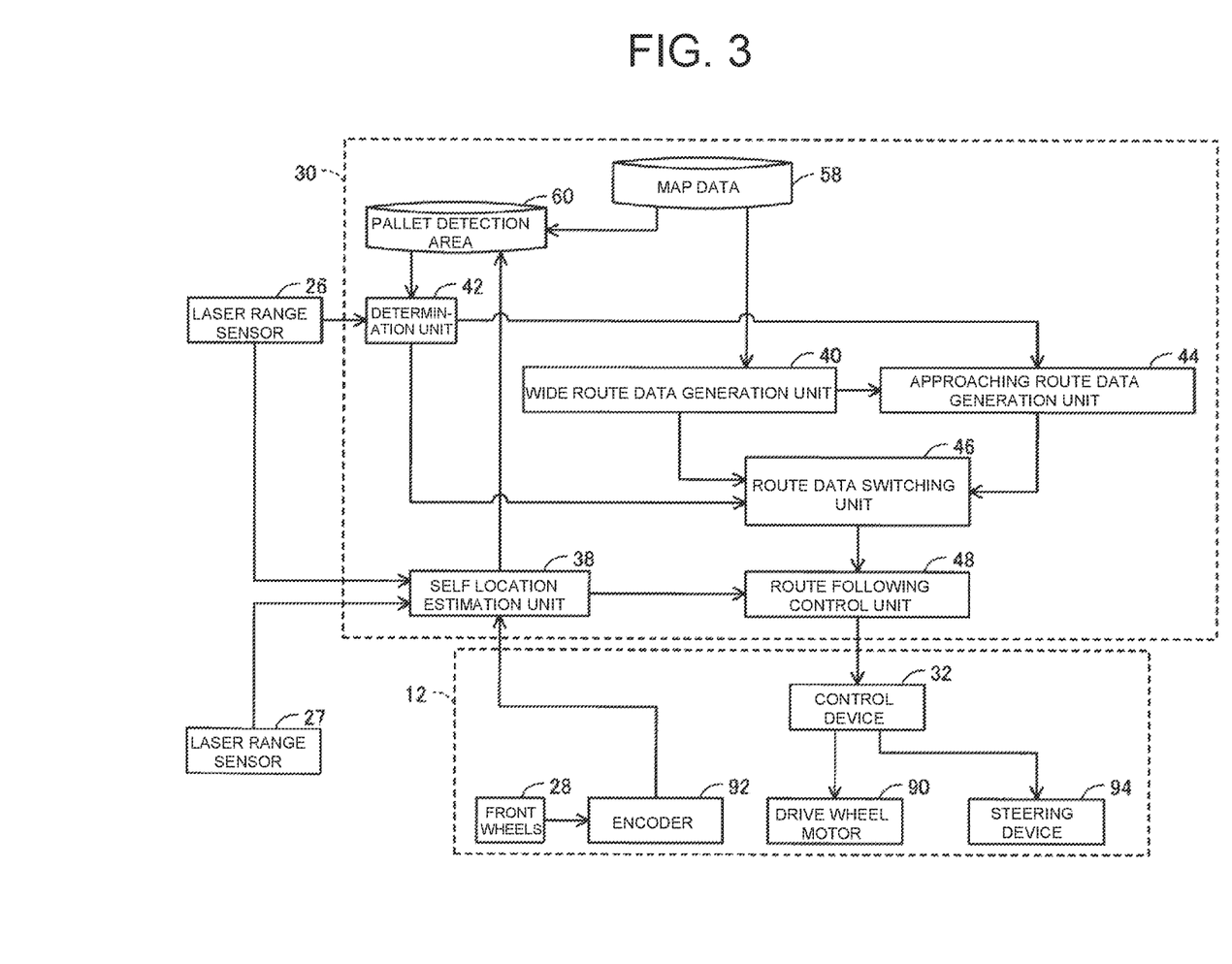
FIG. 3 is a block diagram showing a configuration for controlling the forklift truck according to the embodiment of the present invention.

The following will describe an embodiment of the present invention with reference to accompanying drawings. Referring to FIGS. 1 to 3, there is shown an unmanned forklift truck (an automatic guided forklift truck) 10 that includes a vehicle body 12, a mast assembly 20, a fork assembly 22, a lift chain 24, laser range sensors 26, 27, an operation device 30 (see FIG. 3), and a control device 32 (see FIG. 3).

The vehicle body 12 of the forklift truck 10 includes a pair of front wheels 28 and a pair of rear wheels 29 provided on lateral sides of the vehicle body 12. The front wheels 28 and the rear wheels 29 are supported rotatably relative to the vehicle body 12. An encoder 92 (FIG. 3) is connected to each of the front wheels 28 for detecting the rotational amount of the front wheels 28. One of the rear wheels 29 is connected to a drive wheel motor 90 (FIG. 3) via a drive mechanism (not shown) so that the rear wheel 29 is driven to rotate by the drive wheel motor 90. The rear wheel 29 connected to the drive wheel motor 90 is also connected to a steering device 94 (FIG. 3) that controls the orientation of the wheels of the vehicle body 12. The other of the rear wheels 29 is a caster wheel that is rotated and steered following the travel of the vehicle body 12. With the control device 32 controlling the drive wheel motor 90 and the steering device 94, the vehicle body 12 is caused to travel on a road surface and change its traveling direction. The encoder 92 detects the moving amount and a moving direction of the vehicle body 12 based on the motion of the front wheels 28. It is to be noted the forklift truck 10 corresponds to the mobile apparatus of the present invention and the vehicle body 12 to the main body of the present invention.

The mast assembly 20 includes a post mounted to the front part of the vehicle body 12 and extending in the vertical direction.

The fork assembly 22 is mounted to the mast assembly 20 so as to be movable in the vertical direction. The fork assembly 22 includes a pair of arms 22A, 22B. The arms 22A, 22B are spaced at a distance in the lateral direction of the vehicle body 12 and extend forward from the mast assembly 20. It is to be noted that fork assembly 22 may be configured to be swingable relative to the mast assembly 20 by using a tilt mechanism (not shown).

The lift chain 24 is mounted to the mast assembly 20 and also engaged with the fork assembly 22. The lift chain 24 is driven by a fork lifting/lowering device (not shown) to lift or lower the fork assembly 22. The vertical position of the fork assembly 22 may be determined based on the drive amount of the fork lifting/lowering device.

The laser range sensor 26 is provided to the vehicle body 12 (specifically, to the mast assembly 20 of the vehicle body 12) and measures a distance between the vehicle body 12 and an object that is present in a space specified in front of the fork assembly 22. The laser range sensor 26 is a one-dimensional scanner that emits laser beams in a single direction. According to the present embodiment, the laser range sensor 26 scans in the horizontal direction. The laser range sensor 26 scans a field 50 of a specified angular range in front of the forklift truck 10. The laser range sensor 26 measures a distance between the vehicle body 12 and an object that is present in the field 50 by means of the laser beams reflected back by the object to obtain data of the distance to the object present in front of the forklift truck 10. The distance data obtained by the laser range sensor 26 is sent to the operation device 30. It is to be noted that scanning may also be performed in two dimensions, i.e., the horizontal and vertical directions, by mounting the laser range sensor 26 to the fork assembly 22 so that the laser range sensor 26 is movable vertically with the vertical motion of the fork assembly 22. With this configuration, distance data of the scanned field in front of the forklift truck 10 may be obtained in three dimensions.

The laser range sensor 27 is provided to the vehicle body 12 (specifically, to the rear part of the vehicle body 12) and measures a distance between the vehicle body 12 and an object that is present in a space specified behind the forklift truck 10. As with the laser range sensor 26, the laser range sensor 27 is a one-dimensional scanner that emits laser beams in a single direction. The laser range sensor 27 scans a field 51 of a specified angular range behind the forklift truck 10. The laser range sensor 27 measures a distance between the vehicle body 12 and an object that is present in the field 51 by means of the laser beams reflected back by the object to obtain data of the distance to the object in the rear of the forklift truck 10. The distance data obtained by the laser range sensor 27 is sent to the operation device 30.

It is to be noted that the laser range sensor 26 of the present embodiment is used to detect a pallet 100 and to estimate the location of the forklift truck 10 itself (or the self location of the forklift truck 10), which will be described later in detail. While the forklift truck 10 is handling the pallet 100 carrying a load, the laser range sensor 26 is unable to obtain distance data. Therefore, when the forklift truck 10 is handling a load, the laser range sensor 27 provided in the rear part of the forklift truck 10 measures a distance between the vehicle body 12 and an object that is present in the peripheral area of the vehicle body 12 to estimate the self location of the forklift truck 10 based on the obtained distance data. It is to be noted that sensors such as UTM-30LX manufactured by Hokuyo Automatic Co., Ltd. and LMS100 manufactured by SICK AG may be used for the laser range sensors 26, 27. The laser range sensors 26, 27 correspond to the range sensor of the present invention.

The control device 32 includes a microprocessor having a CPU and the like. The control device 32 is mounted in the vehicle body 12. As shown in FIG. 3, the control device 32 is connected communicably to the drive wheel motor 90 and the steering device 94 to control the drive wheel motor 90 and the steering device 94. Specifically, the control device 32 drives the drive wheel motor 90 and the steering device 94 to thereby control the travel direction and the travel speed of the forklift truck 10. The control device 32 sends a control command value to the drive wheel motor 90 and the steering device 94 and one of the rear wheels 29 is driven accordingly. With this operation, the travel direction, the travel speed, and the traveling route of the forklift truck 10 are determined and controlled. It is to be noted that the detailed description of the control of the travel direction and the travel speed of the forklift truck 10 is omitted because such control is achieved by a known method.

The operation device 30 includes a microprocessor having a CPU and the like. The operation device 30 is mounted in the vehicle body 12. As shown in FIG. 3, the operation device 30 is communicably connected to the laser range sensors 26, 27 and the control device 32. The operation device 30 is operable to execute a program stored in a memory of the operation device 30 to cause the laser range sensor 26 to operate for detection of the pallet 100 and generates a route data according to which the forklift truck 10 is moved to a position (target location Po (Xo, Yo, θo)) for the forklift truck 10 to pick up the detected pallet 100. Specifically, the operation device 30 first determines the self location of the forklift truck 10 by measuring distances between the vehicle body 12 and objects that are present in the peripheral area of the forklift truck 10 by the laser range sensors 26, 27 based on a map data 58 that is preliminarily stored in the operation device 30. The operation device 30 then performs calculations to generate a route data (a wide route data 62) according to which the forklift 10 is moved from a first specified location P1 (X1, Y1, θ1) or the initial location of the forklift truck 10 to a second specified location P2 (X2, Y2, θ2) set in a scanning range (a pallet detection area 60) in which the laser range sensor 26 may detect the pallet 100. Subsequently, the operation device 30 sends to the control device 32 a wide control command value that is calculated based on the generated wide route data 62. Accordingly, the control device 32 causes the forklift truck 10 to move while controlling the drive wheel motor 90 and the steering device 94. When the vehicle body 12 enters the pallet detection area 60, the operation device 30 causes the laser range sensor 26 to detect the location and the posture of the pallet 100 and generates a pallet data 66. Based on the location and the posture of the pallet 100 (the pallet data 66), the operation device 30 generates a route data (an approaching route data 64) according to which the vehicle body 12 is moved to a location where the forklift truck 10 picks up the pallet 100 (the target location Po). Lastly, the operation device 30 sends to the control device 32 a control command value that is calculated based on the generated approaching route data 64. With this operation, the control device 32 causes the vehicle body 12 to move to the target location Po while controlling the drive wheel motor 90 and the steering device 94. Specifically, as shown in FIG. 3, the operation device 30 includes or functions as a self location estimation unit 38, a wide route data generation unit 40, a determination unit 42, an approaching route data generation unit 44, a route data switching unit 46, and a route following control unit 48. The control device 32 drives the vehicle body 12 based on the control command value received from the operation device 30 to thereby move the vehicle body 12 to the target location Po for picking up the pallet 100. The details of the self location estimation unit 38, the wide route data generation unit 40, the determination unit 42, the approaching route data generation unit 44, the route data switching unit 46, and the route following control unit 48 will be described hereinbelow in connection with the operation of the operation device 30 shown in the flow chart of FIG. 4.

Figure 4:
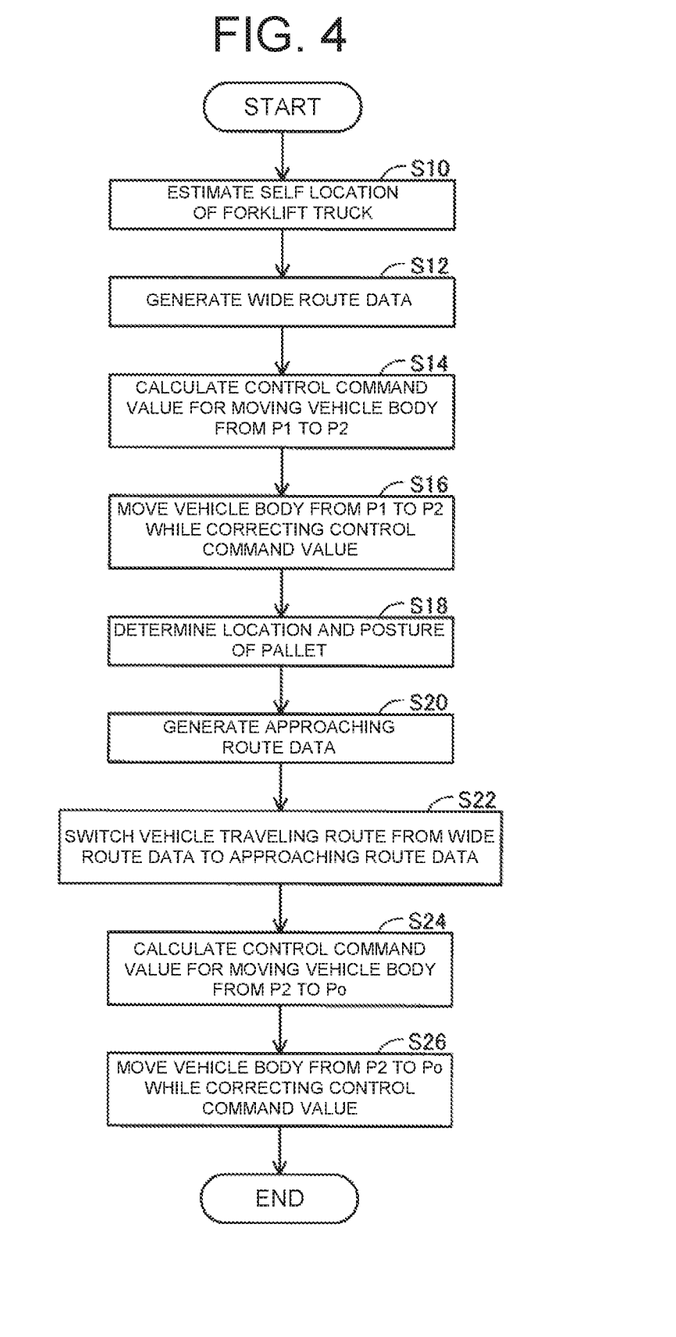
FIG. 4 is a flow chart showing a procedure for moving the forklift truck from an initial location to a target location.

The following will describe the operation of the operation device 30 and the control device 32 to move the forklift truck 10 to the location for picking up the pallet 100 (the target location Po) with reference to the flow chart of FIG. 4. Referring to FIG. 4, at step S10, the operation device 30 first estimates the self location of the forklift truck 10 based on the map data 58 and the data of distances between the vehicle body 12 and objects in the peripheral area of the forklift truck 10 measured by the laser range sensors 26, 27. The map data 58 includes information about locations and sizes of objects (e.g. a pillar and a wall) present in a space in which the forklift truck 10 moves around (the moving space). Specifically, the location of the forklift truck 10 is represented by coordinates (x, y, z) in the moving space of the forklift truck 10 and subscripts 1 or 0 indicating whether an object (e.g. a pillar, a wall, or an obstacle) is present or not at the position. The map data 58 may be generated, for example, based on measurement results obtained by measuring with the laser range sensors 26, 27 the distances between the vehicle body 12 and the objects in the area where the forklift truck 10 moves around. As described earlier, the map data 58 includes information about locations of pillars and walls and the like in the moving space of the forklift truck 10. With the locational data in the map data 58 the operation device 30 determines an area in which the forklift truck 10 is travelable. Meanwhile, the objects that are present in the peripheral area of the forklift truck 10 (specifically, the area that is detected by the laser range sensors 26, 27) are detected at a start of the afore-mentioned step S10 by the laser range sensors 26, 27. The operation device 30 cross-checks the map data 58 stored therein and the objects detected by the laser range sensors 26, 27 (or the environmental map of the peripheral area of the forklift truck 10) to thereby determine the current location and the posture of the forklift truck 10. It is to be noted that the estimation of the self location of the forklift truck 10 may be performed by one of the laser range sensors 26, 27 or both. It is also to be noted that a known method is applicable to the identification of the self location of the forklift truck 10 that uses the map data 58 and the detection results from the laser range sensors 26, 27. Thus, the location and the posture of the forklift truck 10 at the first specified location P1 may be calculated. Data about the pallet detection area 60 and the second specified location P2 that is specified within the pallet detection area 60 is stored preliminarily in the operation device 30. When the location and the posture of the forklift truck 10 at the first specified location P1 (or the initial location) is calculated, the operation device 30 is enabled to determine the positional relationship between the first specified location P1 and the second specified location P2. It is to be noted that pallet detection area 60 is set at an area that is defined in the vicinity of the position where the pallet 100 is placed and also in a range of an area at specified distance from the pallet 100 on the basis of the detection range of the laser range sensor 26 (i.e. the measurable distance or range by the laser beams of the range sensor 26). It is to be noted that the self location of the forklift truck 10 can be calculated based on the rotation amount of the front wheels 28 (i.e., calculation of the odometry). However, the estimation of the self location of the forklift truck 10 based on the detection results from the laser range sensors 26, 27 may be performed sequentially while the forklift truck 10 is traveling. At step S10, the operation device 30 functions as the self location estimation unit 38 shown in FIG. 3.

Subsequently, at step S12, the operation device 30 generates the wide route data 62 for movement of the vehicle body 12 from the first specified location P1 to the second specified location P2 that is set within the pallet detection area 60. Specifically, the operation device 30 determines the time required for the vehicle body 12 to move from the first specified location P1 to the second specified location P2 based on the data of the location and the posture of the forklift truck 10 at the first specified location P1 and the data of the location and the posture of the forklift truck 10 at the second specified location P2 to thereby generate a wide speed plan and a wide route plan. Subsequently, based on the generated wide speed plan and the wide route plan, the operation device 30 calculates a wide target location and a wide target posture (the wide route data 62) at different specified points of time while the vehicle body 12 is moving from the first specified location P1 to the second specified location P2. For the wide speed plan and the wide route plan, a known method such as the linear interpolation and the spline interpolation may be used. At step S12, the operation device 30 functions as the wide route data generation unit 40 in FIG. 3.

Figure 5:
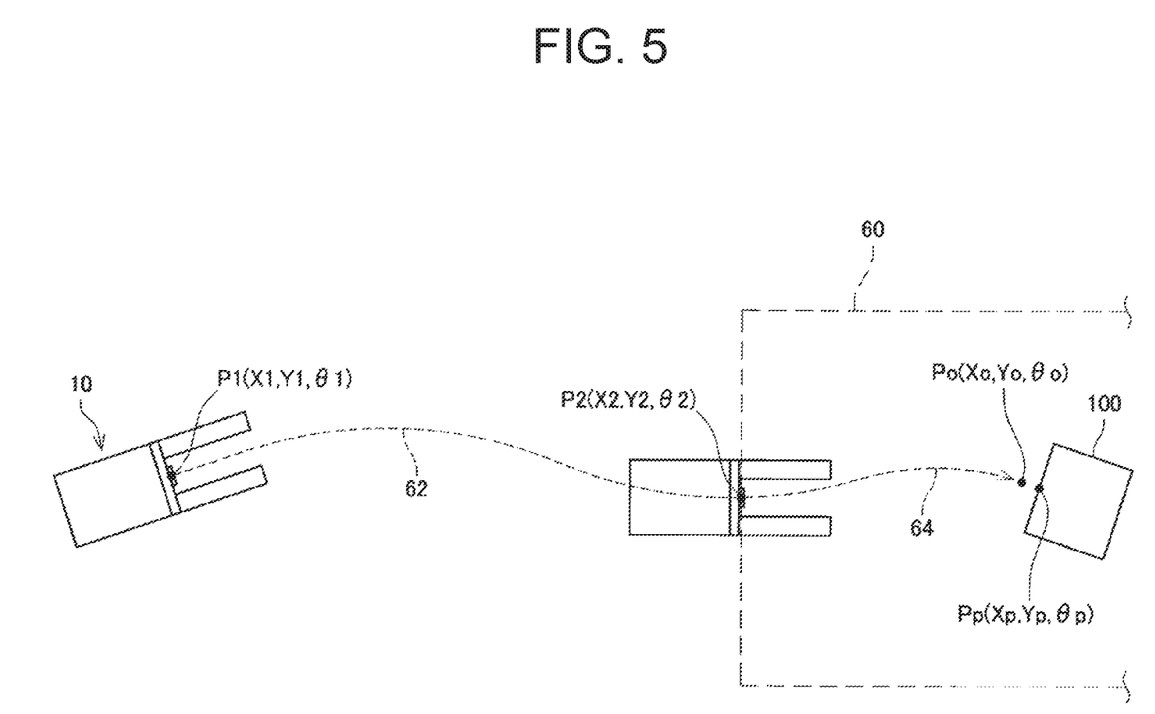
FIG. 5 is a diagram showing a transition of the forklift truck moving from the initial location to the target location.

Subsequently, at step S14, the operation device 30 calculates a control command value for the movement of the vehicle body 12 to the second specified location P2 based on the wide route data 62 generated at step S12 and the current location of the forklift truck 10 (the self location calculated by the odometry). According to the present embodiment, the wide route data 62 is corrected sequentially based on the estimated current self location of the forklift truck 10 and the second specified location P2 while the forklift truck 10 is moving from the first specified location P1 to the second specified location P2. In other words, each time the vehicle body 12 moves, deviation is calculated from the current location and the second specified location P2, and the control command value of the wide route data 62 (i.e., the translation speed and the angular velocity) is corrected through a feedback control. At step S14, the operation device 30 functions as the route following control unit 48 in FIG. 3. The generated wide route data 62 (the control command value) is sent to the control device 32 and the control device 32 causes the vehicle body 12 to move toward the second specified location P2 as shown in FIG. 5.

When the forklift truck 10 enters the pallet detection area 60, the laser range sensor 26 measures the distance between the vehicle body 12 of the forklift truck 10 and the pallet 100. Data of approximate location of the pallet 100 is stored preliminarily in the operation device 30. Based on the approximate location of the pallet 100, the pallet detection area 60 and the second specified location P2 are determined and thereby the posture of the forklift truck 10 to be taken at the second specified location P2 is determined. Therefore, when the forklift truck 10 enters the pallet detection area 60, the pallet 100 may be detected by the laser range sensor 26. Then, at step S18, the operation device 30 determines the actual location and posture Pp (Xp, Yp, θp) of the pallet 100 based on the distance data from the laser range sensor 26. At step S18, the operation device 30 functions as the determination unit 42 in FIG. 3.

Subsequently, at step S20, the operation device 30 generates the approaching route data 64 for the movement of the vehicle body 12 from the second specified location P2 to the target location Po based on the detection results (i.e., the location and the posture of the pallet 100) of the determination unit 42. When the vehicle body 12 is at the target location Po, the vehicle body 12 is placed in a specified location and a specified posture with respect to the pallet 100, that is, the target location Po is the location for the forklift truck 10 to pick up the pallet 100. When the forklift truck 10 enters the pallet detection area 60 and the determination unit 42 determines the location and the posture of the pallet 100 at step S18, the operation device 30 starts generating the approaching route data 64. Specifically, the operation device 30 generates the approaching route data 64 while the vehicle body 12 is traveling according to the wide route data 62. Based on the target location and the target posture of the forklift truck 10 at the current time and the target location and the target posture of the forklift truck 10 at the target location Po, the operation device 30 determines the time required for the vehicle body 12 to move from the current location to the target location Po to thereby generate an approaching speed plan and an approaching route plan. Subsequently, based on the generated approaching speed plan and the approaching route plan, the operation device 30 calculates the approaching target location and the approaching target posture (the approaching route data 64) at specified points of time while the vehicle body 12 is moving toward the target location Po. It is to be noted that the operation device 30 may generate the approaching route data 64 by estimating an increased distance in the wide route data 62 for the time period during which the approaching route data 64 is generated. The terminal speed and the direction of the vehicle body 12 in the wide route data 62 at the start of generation of the approaching route data 64 are known. Therefore, the processing may be such that a sum of the time period required for the laser range sensor 26 to detect the pallet 100 at step S18 and the time period required for generating the approaching route data 64 is obtained based on the detection result of the pallet 100 at step S20 and then, based on the resultant sum, an increased distance in the wide route data 62 for the time period between the aforementioned two time periods is estimated, and to generate the approaching route data 64 for the movement of the vehicle body 12 from the estimated location to the target location Po. For the approaching speed plan and the approaching route plan, a known method, such as the B-spline curve interpolation and the clothoid curve interpolation, may be used. At step S20, the operation device 30 functions as the approaching route data generation unit 44 in FIG. 3.

Figure 6:
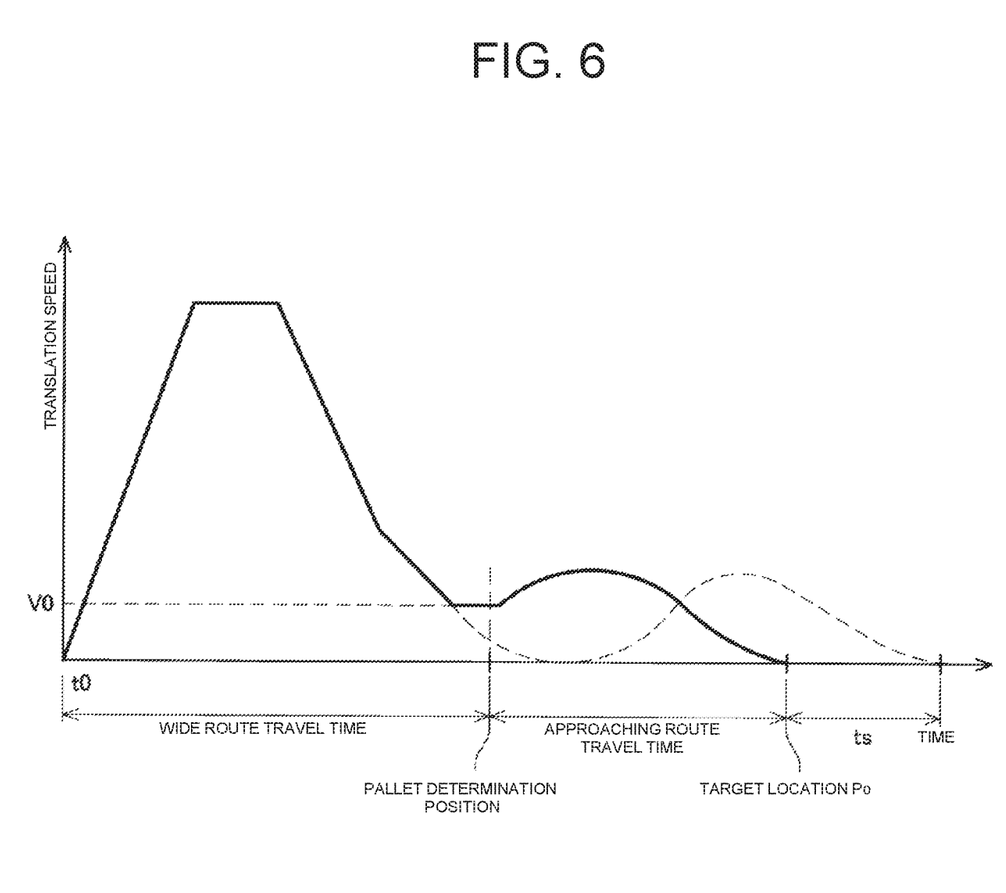
FIG. 6 is a graph showing changes in the speed of the forklift truck in different time periods while the forklift truck is moving from an initial location to a target location.

After the approaching route data 64 is generated, the operation device 30 switches the traveling route for the vehicle body 12 from the wide route data 62 to the approaching route data 64 at step S22. As shown in FIG. 6, the operation device 30 generates the approaching route data 64 so that the terminal speed of the vehicle body 12 traveling according to the wide route data 62 and the initial speed of the vehicle body 12 traveling according to the approaching route data 64 are both V0, that is, the same speed is set for the terminal speed of the vehicle body 12 traveling according to the wide route data 62 and the initial speed of the vehicle body 12 traveling according to the approaching route data 64. Therefore, the operation device 30 switches the route from the wide route data 62 to the approaching route data 64 while maintaining the smooth traveling motion of the vehicle body 12 without causing the vehicle body 12 to pause or stop. The initial speed of the vehicle body 12 traveling according to the approaching route data 64 may be calculated, for example, by giving a speed (V0≠0) in the initial control point in the B-spline curve. At step S22, the operation device 30 functions as the route data switching unit 46 in FIG. 3. It is to be noted that the curve of the dashed line in FIG. 6 is a comparative example in which the forklift truck 10 stops temporarily when the route of the vehicle body 12 is switched from the wide route data 62 to the approaching route data 64, more specifically, in which the vehicle speed of the forklift truck 10 becomes zero when the laser range sensor 26 detects the pallet 100.

Subsequently, at step S24, the operation device 30 calculates a control command value for the movement the vehicle body 12 to the target location Po based on the generated approaching route data 64 and the current location of the forklift truck 10. According to the present embodiment, as in the case of step S14, the approaching route data 64 is corrected sequentially based on the estimated current location (the self location calculated by the odometry) and the target location Po also while the forklift truck 10 is moving from the current location to the target location Po. In other words, each time the vehicle body 12 moves, deviation is calculated from the current location and the target location Po, and the control command value of the approaching route data 64 (that is, the translation speed and the angular velocity) is corrected through a feedback control. At step S24, the operation device 30 functions as the route following control unit 48 in FIG. 3. Then, at step S26, the generated approaching route data 64 (or the control command value) is sent to the control device 32, which then causes the vehicle body 12 to move to the target location Po as shown in FIG. 5. The sequence of operations of the operation device 30 ends after the step S26 has been completed.

According to the forklift truck 10 of the present embodiment, firstly the wide route data generation unit 40 generates the wide route data 62 according to which the vehicle body 12 is moved from the first specified location P1 to the second specified location P2 at which the pallet 100 may be detected and determined by the determination unit 42. Then the approaching route data generation unit 44 generates the approaching route data 64 for the movement of the vehicle body 12 from the second specified location P2 to the target location Po. The approaching route data 64 is generated while the vehicle body 12 is traveling in accordance with the wide route data 62. Therefore, the forklift truck 10 is able to detect the pallet 100 while the vehicle body 12 is traveling. After the approaching route data 64 is generated, the route data switching unit 46 switches the traveling route for the vehicle body 12 from the wide route data 62 to the approaching route data 64. Therefore, at the time of switching the routes for the vehicle body 12, the forklift truck 10 may be moved to the target location Po smoothly without being stopped, with the result that the time required for the vehicle body 12 to move to the target location Po is reduced. According to the present embodiment, as compared with the case in which the forklift truck 10 stops temporarily at the time of the switching from the wide route data 62 to the approaching route data 64, as shown in FIG. 6, the time required for moving to the target location Po is reduced by the time is that is indicated in FIG. 6. In other words, the arrival time of the forklift truck 10 will be earlier.

Furthermore, the approaching route data 64 is generated based on the results of detection of the pallet 100 by the determination unit 42. Therefore, even in the case where the location and/or the posture of the pallet 100 is deviated from the stored data of the pallet location and posture, the target location Po is calculated accurately.

It is to be noted that the drive wheel motor 90 and the steering device 94 correspond to the mobile mechanism of the present invention.

Although an embodiment of the present invention has been described in detail, the embodiment is an example and does not intend to limit the scope of the present invention. Various modifications of the above embodiment are included in the scope of the present invention.

For example, in the generation of the approaching route data 64, the translation speed of the vehicle body 12 traveling according to the approaching route data 64 may be configured to be variable according to the magnitude of the deviation (the deviations of the location and the posture) from the pallet 100. In other words, when the deviation is large, the route may be corrected by reducing the translation speed, and when the deviation is small, the time for the movement of the forklift truck 10 may be saved by increasing the translation speed.

The wide route data 62 and the approaching route data 64 are sequentially corrected through a feedback control by the route following control unit 48. According to the present invention, however, the vehicle body 12 may travel according to the initially generated wide route data 62 and the approaching route data 64 without performing the feedback control.

Although one-dimensional scanners are used for the laser range sensors 26, 27 in the above embodiment, two-dimensional scanners may alternatively be used.

The components described in the disclosure and the drawings exhibit the significance when used alone or in various combinations, and therefore, the present invention is not limited to the combinations described herein. The technique disclosed herein and the drawings are to attain a plurality of purposes at the same time, and accordingly, attainment of one of the purposes constitutes the technical significance of the invention.

What is claimed is:

1. A mobile apparatus that moves in a specified range, comprising:
   a main body;
   a laser range sensor that is mounted to the main body and configured to measure a distance between the main body and an object that is present at a position in a specified direction with respect to the main body;
   a microprocessor having a CPU configured to generate a route data according to which the main body is moved; and
   a drive wheel motor and a steering device which are configured to move the main body according to the route data generated by the microprocessor, wherein
   the microprocessor is configured to:
      generate a wide route data according to which the main body is moved from a first specified location to a second specified location, the first specified location and the second specified location being set in the specified range,
      determine a location and a posture of a reference object that is located in the vicinity of the second specified location based on the measured distance received from the range sensor, and
      generate, based on the determined location and posture of the reference object, an approaching route data according to which the main body is moved from the second specified location to a target location at which the main body is placed in a specified location and a specified posture with respect to the reference object,
   wherein the mobile apparatus further comprises a route data switch configured to switch a traveling route for the main body from being based on the wide route data to the approaching route data after the approaching route data is generated,
   wherein the microprocessor is further configured to generate the approaching route data while the main body is traveling according to the generated wide route data, and
   wherein in the approaching route data a same speed is set for a terminal speed of the main body traveling according to the wide route data and an initial speed of the main body traveling according to the approaching route data.

2. The mobile apparatus according to claim 1, wherein the microprocessor is further configured to correct the approaching route data sequentially based on the determined location and posture of the reference object while the main body is moving from the second specified location to the target location.

3. The mobile apparatus according to claim 1, wherein the mobile apparatus is a forklift truck having a fork assembly mounted to the main body,
   a specified angular range is provided in the specified direction with respect to the forklift truck, and
   the laser range sensor detects an object that is present in a space specified in front of the fork assembly and within the specified angular range.

* * * * *